United States Patent [19]  [11] 4,092,407
Rohrborn et al.  [45] May 30, 1978

[54] PRODUCING IRON OXIDE WEIGHTING MATERIALS FOR DRILLING FLUIDS

[75] Inventors: Hans-Joachim Rohrborn, Kapellen bei Moers; Rainer Homann, Duisburg; Heribert Conrady, Duisburg; Dieter Menzel, Duisburg, all of Germany

[73] Assignee: Metallgesellschaft Aktiengesellschaft, Frankfurt am Main, Germany

[21] Appl. No.: 699,257

[22] Filed: Jun. 24, 1976

[30] Foreign Application Priority Data

Jun. 26, 1975 Germany ............................. 2528464

[51] Int. Cl.² .......................... C01G 49/02; C09K 7/00
[52] U.S. Cl. .................................. 423/633; 252/8.5 B
[58] Field of Search ..................... 252/8.5 B; 423/632, 423/633; 75/1, 5

[56] References Cited

U.S. PATENT DOCUMENTS

| 2,298,984 | 10/1942 | Stinson | 252/8.5 B |
| 2,820,704 | 1/1958 | Allen | 75/5 |
| 3,245,778 | 4/1966 | Ban | 75/5 |
| 3,867,128 | 2/1975 | Hancock | 423/632 |
| 3,887,474 | 6/1975 | Senfe | 252/8.5 B |

Primary Examiner—O. R. Vertiz
Assistant Examiner—Brian E. Hearn
Attorney, Agent, or Firm—Karl F. Ross

[57] ABSTRACT

Weighting material for a drilling fluid, e.g. a drilling mud, is produced by firing iron oxide solids, e.g. iron oxide ores, calcined pyritic ores or iron-oxide-containing products of other metallurgical processes, in a circulating fluidized bed or rotary furnace at a temperature of 1210° C to 1400° C in an oxidizing atmosphere in which the oxygen content is augmented to transform magnetitic components to oxides of lower magnetic susceptibility. The product is then cooled slowly at least until it reaches a temperature of 780° C, also in an oxidizing atmosphere. The weighting materials have extremely low magnetic susceptibility and thus can be used without interfering with inductive monitoring of the position of the drill string.

5 Claims, No Drawings

PRODUCING IRON OXIDE WEIGHTING MATERIALS FOR DRILLING FLUIDS

FIELD OF THE INVENTION

This invention relates to a process of producing weighting materials for drilling fluids (mud fluids) from solids which contain mainly iron oxide.

BACKGROUND OF THE INVENTION

Drilling fluids are used in deep-well-drilling operations to carry off the rock which has been detached by the drilling tools, to cool the rotary drill and to limit entry of fluids into the hole. In large depths, the formation pressure increases so that the drilling fluid must be weighted with materials having a high specific gravity. Known weighting materials are, e.g., baryte, quartz, iron oxides and lead oxides, zinc dust (U.S. Pat. No. 2,099,825). The Opened German Specification No. 2,362,712 teaches a process in which non-magnetic materials which contain iron oxide and have a specific gravity of at least 4.2 are produced in that iron ore is calcined at 927° to 1121° C under oxidizing conditions and the burned material is subsequently quenched. The resulting product is intended for use as a weighting agent in drilling fluids.

It is also known to use calcination products of sulfide ores as a weighting agent in drilling fluids. German Pat. Specification No. 2,139,952 teaches a process in which pyrite is recovered by flotation and subsequently calcined in a fluidized bed and the calcine is used in a specific particle size below 75 microns. The Soviet Union Pat. Specification No. 70,794 teaches a process in which weighting materials for drilling fluids are produced by burning calcined pyrites at 700° to 800° C and then cooling them. The magnetite pyrite which is thus formed is subsequently separated and ground for use as the weighting material.

In accordance with U.S. Pat. No. 2,276,075, magnetic materials in a particle size below 44 microns are used as weighting materials. These materials consist, e.g. of artificial magnetite, which has been produced by a calcination of non-magnetitic iron oxides under reducing conditions.

The advantages of the use of magnetic weighting agents are seen in that they can easily be separated by a magnetic separator from the drilling fluid which has been contaminated with drilling detritus.

In the process taught in U.S. Pat. No. 2,298,984, a weighting agent is made by burning calcined pyrite at temperatures of at least 980° C in a preferably oxidizing atmosphere and in the presence of accelerators consisting, e.g. of alkali metal salts. This treatment serves to eliminate sulfur to a residual content of about 0.2%. In the last-mentioned prior publication, apparently no significance was attached to the magnetic properties of the weighting agent because it was stated that the ignition can be effected in a neutral or reducing or oxidizing atmosphere and presumably the product is the usual ferromagnetic oxide.

It has previously been believed, as a rule, that ferromagnetic weighting agents consisting of iron oxides, such as magnetite, are the most suitable weighting agents, presumably because they can be more easily separated from spent drilling fluids.

Where calcined pyrite has been proposed as weighting agent, the highly magnetically susceptible magnetite contained therein in general as a result of the production processes has been tolerated or even desired. It has, however, been recognized (U.S. Pat. No. 3,867,128) that magnetic properties are disadvantageous.

Various solid iron oxides have different magnetic susceptibilities H, namely

| Magnetite | up to $90,000,000 \times 10^{-6}$ |
|---|---|
| Magnetite pyrite | up to $150,000 \times 10^{-6}$ |
| Hematite | up to $13,000 \times 10^{-6}$ |
| Limonite | up to $2,800 \times 10^{-6}$ |

It has been found that the use of drilling fluids which are weighted with ferromagnetic iron oxides or iron oxides having a substantial ferromagnetic content produce undesired results and disturbances in the inductive monitoring of the position of the drill pipe in the hole.

OBJECT OF THE INVENTION

It is an object of the invention to provide a weighting material which contains iron oxide in a simple and economical manner and is virtually free from magnetic constituents and free from water-soluble salts and does not flocculate to destroy the stability of the drilling fluid.

DESCRIPTION OF THE INVENTION

This object is accomplished by the invention in a process of producing weighting agents for drilling fluids in which solids consisting mainly of iron oxide are fixed at temperatures above 1200° C in an oxidizing atmosphere and subsequently cooled. In accordance with the invention, the solids are treated at a temperature of 1210° to 1400° C in an atmosphere which contains such a surplus of oxygen that the oxygen partial pressure is in excess of the equilibrium oxygen partial pressure of the iron oxide at the temperature at which the solids are fired, and the solids are subsequently slowly cooled to 780° C in an oxidizing atmosphere.

We have found that the lower temperature limit of 1210° C is critical for effective transformation, in the aforementioned oxygen-enriched atmosphere, of any magnetitic component to oxides of substantially lower magnetic susceptibility. At temperatures above 1400° C, the effect is no longer significant.

Furthermore, the temperature of 780° C to which the solids are slowly cooled, whereupon the cooling rate can be increased or quenching can be carried out, is likewise critical to maintain the transformation of the magnetitic component or oxide components of highly magnetic susceptibility to components of low magnetic susceptibility. When quenching is used, for example, from the higher temperature range so that the cooling is sudden, the desired phenomenon of low magnetic susceptibility is not obtained.

Preferably the cooling rate is from 1° to 40° C per minute with best results being obtained with a cooling rate between 10° and 30° C per minute.

The existence of an oxidizing atmosphere during the cooling is also essential to the present invention and this atmosphere can be atmospheric air or atmosphere air enriched with oxygen. The degree of enrichment can range from say 5 to 50% oxygen, i.e. the oxidizing atmosphere can contain 20% to about 70% by volume oxygen.

The oxidizing atmosphere at which the firing is carried out is of course, also critical and must have an oxygen partial pressure of the iron oxide at the temperature at which the solids are fired. This result can be obtained by simply enriching ambient air with oxygen so that the atmosphere contains a preponderance of oxygen, or by simply adding oxygen or changing the atmosphere as required so that the oxygen in the presence of the heated solids never falls below say 5% by volume. Consequently, if the oxidizing atmosphere is ambient air, it can be passed over the solids so that the exhaust gases contain a minimum of 5% by volume oxygen. Alternatively, the atmospheric oxygen can be enriched with 5% to 50% by volume oxygen so that, upon contacting the solids, the atmosphere contains between 20% and 70% by volume oxygen. In no case should the oxygen content of the atmosphere be less than say 5% by volume oxygen.

While we do not fully understand the effects of the abovedescribed treatment, we can note that there appears to be a transformation of the more highly magnetically susceptible material into oxides of low magnetic susceptibility and a modification of the physical structure of the product to improve its utility as a weighting material.

We have given the requisite oxygen level in terms of partial pressures since varying compositions can use oxidizing atmospheres with different minimum oxygen contents and the partial pressures serve as a convenient guide for the mean oxygen level in the atmosphere. The results, however, can also be used as a guide, e.g. the oxygen level of the atmosphere in contact with the solids can be increased during the heating thereof until the magnetic susceptibility of the products falls below say $10,000 \times 10^{-6}$ and preferably below $5,000 \times 10^{-6}$. Still better results are obtained when the susceptibility is reduced below $1,000 \times 10^{-6}$. Of course, if the oxygen level is maintained sufficient high, one need not be concerned that the desired vapor pressure relationship will not be reached.

The starting materials used in the process according to the invention consist mainly of iron oxide and have a specific gravity of at least 4. These materials include, e.g., iron ores, such as hematitic ores or siderite, or calcinated sulfide iron ores, e.g., calcinated fine pyrites or pyrites recovered by flotation. It is also possible to use calcines which have previously been treated for a recovery of specific valuable substances, e.g., subjected to a clorinating calcination for a recovery of non-ferrous metals.

The surplus oxygen is required during the ignition in order to prevent a formation of ferromagnetic constituents or to keep the content thereof below a disturbing level. This content, e.g., magnetite, can easily be determined by a measurement of the magnetic susceptibility, which must not exceed 1%. The ignition is generally carried out a temperatures of 1210° to 1400° C.

The firing under oxidizing conditions in a gas stream which contains an excess of oxygen may be carried out in any desired equipment. Depending on the equipment employed, e.g., a rotary kiln on a fluidized-bed furnace, the firing is performed for 10 to 180 minutes. The treatment in a circulating fluidized bed has proved particularly desirable and economical.

The firing of, e.g., calcined pyrite at 1210° to 1400° C oxidizing conditions results in a material which has paramagnetic properties and in a thermal decomposition of the water-soluble salts which are inherently contained in the calcine, particularly as sulfates, so that the produce is entirely free of sulfur. The cationic components of the salts, such a manganese, zinc or calcium, are combined as insoluble ferrites, so that there is no need for a washing step to remove these salts.

The produce of the process according to the invention has a specific gravity of at least 4 to 5.2. The ignition results also in a sintering of the porous surface of the fine-grained material, particularly if it contains iron oxides formed by a roasting of sulfide ores.

The material which has been ignited at temperatures up to 1400° C in an atmosphere that contains a surplus of oxygen consists mainly of iron oxide and is subsequently subjected to a slow cooling, also in an oxidizing atmosphere, so that any small amounts of magnetite formed at elevated temperatures are re-oxidized. Such small amounts of $Fe_3O_4$ may have been formed by a thermal elimination of oxygen. The cooling to a temperature of 780° C is generally accomplished within several hours. Because of the iron oxide is paramagnetic below a temperature of 780° C, the material can quickly be cooled to ambient temperatures from 780° C.

The iron-oxide containing material which has been ignited and cooled is subsequently ground and classified to a particle size below 75 microns for use as a weighting agent. The particles below 10 microns should not be in excess of 50%. Such particle size distribution of calcined pyrite for use as weighting agent is known per se. Weighting agents of the kind stated have suitably the following particle size distribution:

| | |
|---|---|
| 50 to 55 % | 30 to 75 microns |
| 10 to 15% | 20 to 30 microns |
| 10 to 15% | 10 to 20 microns |
| 20 to 30% | up to 10 microns. |

The process according to the invention has several important advantages. The undesired ferromagnetic properties of iron oxide-containing solids, particularly calcined pyrite, are eliminated. The weighting agent produced by the process according to the invention has a magnetic susceptibility H below $1,000 \times 10^{-6}$. The ignition removes also the watersoluble salts and decreases the surface area of the product, e.g., in the case of calcined pyrite from about 1.5 to 2.5 $m^2/g$ to about 0.6 $m^2/g$ (measurement BET). This decrease in area and physical change of the surface has an excellent influence on the rheologic properties of the finished product when used in drilling fluids. Such drilling fluids have a much lower apparent viscosity than drilling fluids which contain commercially available barite and known calcined pyrite. The gel strength and the water loss, two additional important parameters of a drilling fluid, are also much lower than those of drilling fluids which contain barite or conventional calcined pyrite. Contrary to drilling fluids weighted with barite, the properties show only small changes when the drilling fluid is subjected to a temperature change test.

The process according to the invention will be explained more fully in the following Examples. The starting material used in the Examples consisted of pyrite which had been recovered by flotation and then roasted in a fluidized bed and contained 0.7% total sulfur and 9% gangue.

EXAMPLE 1

120 kg/h of calcine were reheated in an oxidizing ($\tau$ = 1.08 to 1.1) at 1250° C in a directly heated rotary kiln. The residence time amounted to 30 minutes in the kiln and to 15 minutes in the ignition zone. The material discharged from the kiln was cooled in the air to below 800° C within about 20 minutes and was then pre-crushed in a jaw crusher and was ground to particle sizes below 75 microns in a ball mill provided with a pneumatic separator, through which the solids were circulated at a rate of 230 kg/h.

EXAMPLE 2

In a plant operated with a circulating fluidized bed, 50 kg/h of calcine were calcined in an oxidizing atmosphere at temperatures of 1220° C. 5% to 6% oxygen by volume were measured in the exhaust gas.

The material discharged from the furnace was slowly cooled in the air to 780° C and was then quickly cooled further to the ambient temperature. The cooled product was classified to the following particle size distribution:

| | |
|---|---|
| 30–75 microns | 50–55% |
| 20–30 microns | 10–15% |
| 10–20 microns | 10–15% |
| up to 10 microns | 20–30%. |

In the following table, those properties of the products produced in Examples 1 and 2 which are significant for the use and, for comparison, the corresponding properties of a conventional barite weighting agent, are stated. All products had the particle size distribution stated in Example 2.

| | Product of Example 1 | Product of Example 2 | Comparison Product Barite |
|---|---|---|---|
| Water-soluble salts | 0.05% | 0.05% | ≦0.1% |
| Water-soluble Ca | 85 ppm | 93 ppm | 110 ppm |
| Gram susceptibility | $5000 \times 10^{-6}$ cm$^3$/g | $750 \times 10^{-6}$ cm$^3$/g | ≈0 |
| Viscosity in clay drilling fluid (aqueous suspensions of bentonite) | 35 cP | 35 cP | 55 cP |
| Water loss | 4–5 ml/30 min. | 4–5 ml/30 min. | 7 ml/30 min. |
| After a heating 130° C for 24 hours | 39 cP | 39 cP | 60 cP |
| Water loss | 9 ml/30 min. | 9 ml/30 min. | 12 ml/30 min. |

We claim:

1. A process for producing a weighting material of limited magnetic susceptibility for a drilling fluid which comprises the steps of:
   (a) firing an iron-oxide solid material consisting of calcined fine pyrites or calcined pyrites recovered by flotation, having a relatively high magnetic susceptibility at a temperature between 1210° C and 1400° C in the presence of an oxidizing atmosphere having an oxygen partial pressure in excess of the equilibrium partial pressure of the oxide at the firing temperature, for a period of 10 to 180 minutes and sufficient to reduce the magnetic susceptibility of said solid to a gram magnetic susceptibility below $1000 \times 10^{-6}$; and
   (b) slowly cooling said solid at least to a temperature of 780° C in an oxidizing atmosphere at a rate of substantially 1° C to 30° per minute.

2. The process defined in claim 1 wherein said solid is fired in a circulating fluidized bed.

3. The process of claim 1 wherein said solid is fired in a rotary kiln.

4. The process defined in claim 1, further comprising the step of grinding the cooled solid.

5. The process defined in claim 4 wherein the cooled solid is ground and classified to a particle size of:

| | |
|---|---|
| 30 to 70 microns | 50 to 55% |
| 20 to 30 microns | 10 to 15% |
| 10 to 20 microns | 10 to 15% |
| up to 10 microns | 20 to 30%. |

* * * * *